UNITED STATES PATENT OFFICE.

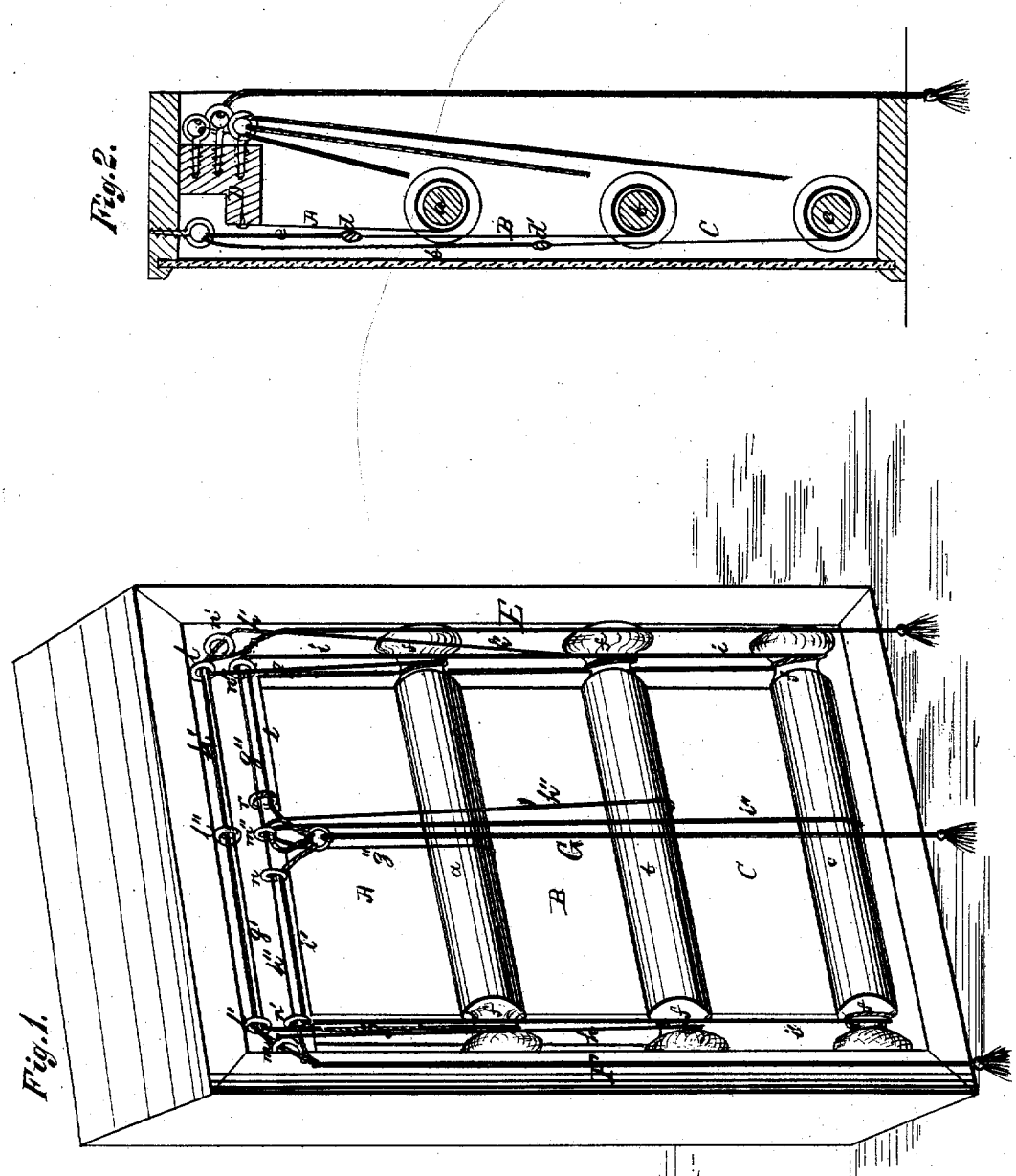

GEORGE W. McGILL, OF SALINEVILLE, OHIO.

IMPROVEMENT IN SECTIONAL WINDOW-SHADES.

Specification forming part of Letters Patent No. 179,123, dated June 27, 1876; application filed October 21, 1875.

*To all whom it may concern:*

Be it known that I, GEORGE W. MCGILL, of Salineville, Columbiana county, in the State of Ohio, have invented an Improved Sectional Window-Shade, of which the following is a specification, reference being had to the accompanying drawings, forming part hereof.

My invention consists in a shade or blind for windows constructed in three separate setions, one section being hung in and extending over the upper part of the window, another section being hung in and extending over the central portion of the window, and the other section being hung in and extending over the lower part of the window, each section being suspended in place by fixed cords, secured at the top of the window, and being provided with a roller on its lower edge, and with cords passing around said rollers at each end and the center thereof, and arranged to pass through eyes placed at the top of the window-frame and there united to single drawcords, which extend down to the lower part of the window, whereby light may be admitted or excluded from the upper, middle, or lower part, or the entire window, at pleasure.

Figure 1 is a view in perspective, showing my sectional window-shade arranged in a window. Fig. 2 is a longitudinal central sectional view of the same.

The section A of the shade is hung from the top of the window-frame D, and extends down over the upper part of the window, as shown. The section B is hung upon the rod $d$, which is sustained somewhat above the lower edge of the section A, and is suspended by fixed cords $e$ from the top of the frame, said cords being of such length only as will permit the said section to cover the center of the window, as shown in Fig. 2. The section C is hung upon the rod $d'$, which is sustained somewhat above the lower edge of the section B, and is suspended by fixed cords $e'$ from the windowframe, said cords being of such length only as to permit the said section to cover the lower part of the window. The several sections A, B, and C, have attached to their lower edges the rollers $a$, $b$, and $c$, respectively, around which they are rolled. The said rollers $a$, $b$, and $c$ are circumferentially grooved at their ends at $f$, as shown, and are furnished respectively with cords $g, g'$, and $g'', h, h'$, and $h''$, and $i, i'$, and $i''$, which are passed around the ends of the rollers in the groove $f$ on either side and the middle of the rollers, respectively, as shown, and extend upward to the eyes fixed in the top of the window-frame. The cord $g$ passes up to and through the eye $l$, the cord $g'$ passes up to and through the eye $l'$ and across the frame through the eyes $l''$ and $l$, and the cord $g''$ passes up to and through the eye $m''$, across to the eye $n''$, through the eye $r$, and all are united to the draw-cord E, as shown in Fig. 1, at one side of the window. The cord $h$ passes up to and through the eye $m$, the cord $h'$ passes up to and through the eye $m'$ and across the frame through the eyes $l, l''$, and $l'$ to and through the eye $m$, and the cord $h''$ passes up to and through the eye $m''$ and across the frame through the eye $n$ to and through the eye $n'$, and all are there united to the draw-cord F at the side of the window. The cord $i$ passes up to and through the eye $n''$ and across the frame to the center thereof through the eye $r$, the cord $i'$ passes up through the eye $n'$ and across the frame to the center through the eye $n$, and the cord $i''$ passes up to and through the eye $m''$, and all are there united to the draw-cord G at the center of the window, as shown. The several cords which pass around the rollers are secured at one end to the top of the frame, and by means of the above-described arrangement of eyes are prevented from becoming tangled during operation. The draw-cords, hanging one at either side and one in the center, are easily distinguishable, and the liability to mistake one for another is obviated.

Now it is evident that by drawing upon either of the cords E, F, or G, the sections A, B, or C, respectively, may be rolled up, and light thus admitted at either the upper, middle, or lower part of the window, and the rollers $a$, $b$, and $c$, being heavy, as shown in the drawings, by releasing either or all of the cords named the light may be excluded from either or all sections of the window, and the sections A and B being rolled up, the three sections may be rolled up together to the top of the frame by continued drawing on the cord G.

I am aware that a window-shade has been heretofore constructed with a single shadepiece suspended on a rod hung on draw-cords passing through eyes set in the top of the frame, whereby the rod holding the shade may be lowered from the top of the window to admit light at said top, while the rest of the window is obscured. I do not intend to claim such a shade thus hung or operated, but limit my claim to the invention I have shown herein, which consists in a shade made in three separate sections, one hung at the top, one at the center, and one at the lower part of the window, and the two latter hung on rods suspended by fixed cords from the top of the window-frame, and each section of the shade operating independently by means of rollers and cords, as described.

What I wish to claim as my invention, and desire to secure by Letters Patent, is—

As an improvement in window-shades, the sections A, B, and C, covering respectively the upper, middle, and lower portions of the window, the sections B and C, respectively, being hung on rods $d$ $d'$, suspended by fixed cords $e$ $e'$ from the top of the window-frame, whereby, by means of rollers $a$, $b$, and $c$, and their attached operating and draw cords, the said sections may be rolled or unrolled independently, and light admitted or excluded from the upper, central, or lower portion of the window, as described.

G. W. McGILL.

Witnesses:
B. C. WISEMAN,
J. G. MOORE.